United States Patent [19]

Soria

[11] Patent Number: 4,828,303

[45] Date of Patent: May 9, 1989

[54] AUTOMOBILE BODY PROTECTION APPARATUS AND METHOD

[76] Inventor: Rolando C. Soria, 5027 West Holly, Phoenix, Ariz. 85035

[21] Appl. No.: 135,044

[22] Filed: Dec. 18, 1987

[51] Int. Cl.$^4$ .............................................. B60R 13/04
[52] U.S. Cl. .................................. 293/128; 280/770; 248/206.3
[58] Field of Search ................ 293/128, 102; 280/770; 248/206.3, 206.2, 362

[56] References Cited

U.S. PATENT DOCUMENTS

| | | | |
|---|---|---|---|
| 1,840,763 | 1/1932 | Benchley | 248/206.3 |
| 2,734,765 | 2/1965 | Henderson et al. | 280/770 X |
| 3,243,223 | 3/1966 | Hoshell | 243/128 X |
| 3,596,962 | 8/1971 | Hertzell | 293/128 |
| 3,659,887 | 5/1972 | Marquette | 293/128 |
| 3,701,507 | 10/1972 | Bell | 248/362 X |
| 3,738,695 | 6/1973 | McBee | 293/128 |
| 4,014,583 | 3/1977 | Forbes | 293/128 |
| 4,355,839 | 10/1982 | Rosen | 296/136 |
| 4,561,685 | 12/1985 | Fisher | 293/128 |
| 4,707,008 | 11/1987 | Falco | 293/128 |
| 4,707,009 | 11/1987 | Barnett | 293/128 |

*Primary Examiner*—Robert B. Reeves
*Assistant Examiner*—Brian Sells
*Attorney, Agent, or Firm*—Harry M. Weiss

[57] ABSTRACT

A body protection apparatus for a behicle such as an automobile is provided for protecting the body from nicks and scratches. The apparatus has a telescoping elongate bar assembly for adjusting the length of the apparatus for overcoming the problem of mounting the apparatus on any size of automobile. The bar assembly has longitudinally slidable suction cups for connecting the bar assembly to a plurality of automobile side panels. The bar assembly is connected to the lower end of an elongate reinforced rubber strap. An upper end of the elongate rubber strap has a bar type member attached to the strap which is locked inside the automobile. The bar type member bears against the window and center post on the inner sides thereof.

6 Claims, 1 Drawing Sheet

AUTOMOBILE BODY PROTECTION APPARATUS AND METHOD

BACKGROUND OF THE INVENTION

1. Field of the Invention

The invention generally relates to an automobile body protection apparatus and method, and, in particular, the invention relates to an automobile body protection method and apparatus having elongate telescoping bar portions with longitudinally adjustable suction cup supports.

2. Description of the Prior Art

A prior art automobile body protection apparatus is shown in U.S. Pat. No. 4,561,685, issued Dec. 31, 1985. Other types of an automobile body protection apparatus are shown in U.S. Pat. Nos. 2,734,765, issued Feb. 14, 1956; 3,610,669, issued Oct. 5, 1971; 4,014,583, issued March 29, 1977; and 4,221,410, issued Sept. 9, 1980.

The prior art protection apparatus includes a generally horizontal, elongate protection member, and a support assembly fixedly connected thereto, as shown in U.S. Pat. Nos. 4,561,685, 3,610,669 and 4,014,583, for protecting a plurality of adjacent side panels of an automobile.

One problem with the prior art protection apparatus is that the generally horizontal, elongate protection member is not easily adjustable in length to suit the different overall dimensions of the panels of different sizes of automobiles.

SUMMARY OF THE INVENTION

According to the present invention, an automobile body protection apparatus is provided. The apparatus includes a generally horizontal, elongate, longitudinally adjustable, telescoping bar assembly suitable for protecting the side panels of different sizes of automobiles, and a plurality of support members which are individually adjustable in a longitudinal direction for supporting respective portions of the bar assembly.

By using a telescoping bar assembly for adjusting its overall length, and by using support members which are individually adjustable in a longitudinal direction, the problem of suiting the overall dimension of side panels of different sizes of automobiles is overcome.

These and other features of the present invention will be understood upon reading of the following description along with the drawings.

BRIEF DESCRIPTION OF THE DRAWINGS

The above advantages and subsequent description will be more readily understood by reference to the following drawings.

DESCRIPTION OF THE PREFERRED EMBODIMENT

Figure 1:
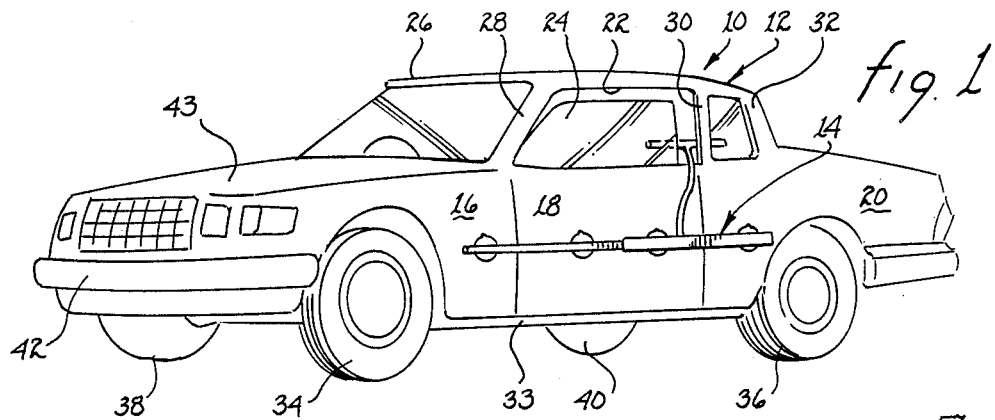
FIG. 1 is a perspective view of an automobile which has an automobile body protection apparatus according to the invention.

In FIG. 1, an automobile 10 is shown. Automobile 10 includes a body 12, and a body protection apparatus 14 which is mounted on body 12.

Body 12 includes a left side front panel 16, a left side door panel 18, and a left side rear panel 20. Left side door panel 18 has a window opening 22, which has a window 24.

Body 12 also has a top portion 26. Top portion 26 has a left side front post 28, a left side center post 30, and a left side rear post 32. Body 12 also has a lower mud guard 33.

Window 24 is movable from a closed position to an open position and back again. Window 24 is framed by front post 28, top portion 26, center post 30, and door panel 18.

Body 12 also has a corresponding right side front panel, right side door, and right side rear panel, which are not shown in FIG. 1. Body 12 also has a corresponding right side window opening and window. Body 12 also has a right side front post, a right side center post, and a right side rear post, which are not shown. Another apparatus, like apparatus 14, can be mounted on the right side of Body 12.

Automobile 10 also includes a left side front wheel 34, a left side rear wheel 36, a right side front wheel 38, and a right side rear wheel 40. Automobile 10 also includes a front bumper 42, and a hood 43.

Figure 2:
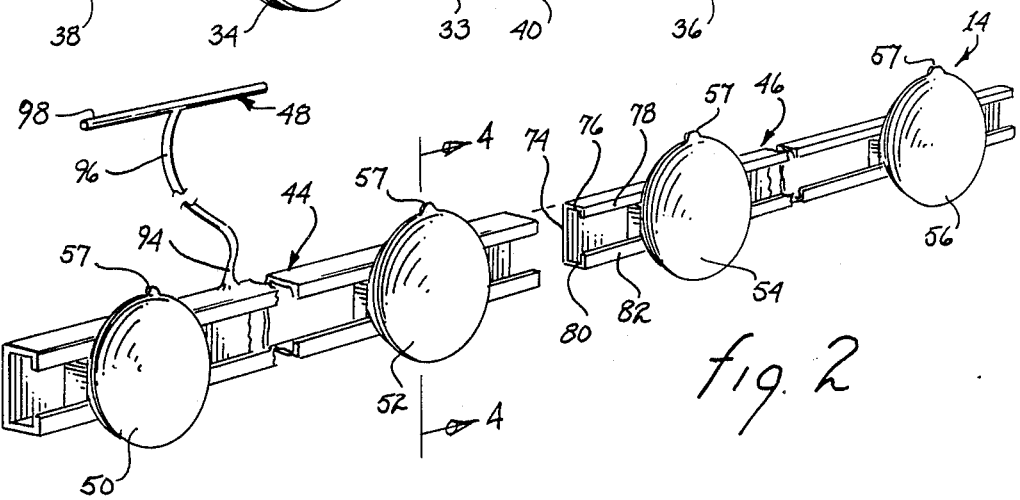
FIG. 2 is an enlarged perspective view of the automobile body protection apparatus of FIG. 1.

As shown in FIG. 2, apparatus 14, which is supported by body 12, includes an outer bar 44, and an inner bar 46, which is telescoped within outer bar 44 to form an elongate, longitudinally adjustable, bar assembly. Apparatus 14 also has a string or flexible strap and bar arrangement 48, which is fixedly connected to outer bar 44.

Figure 3:
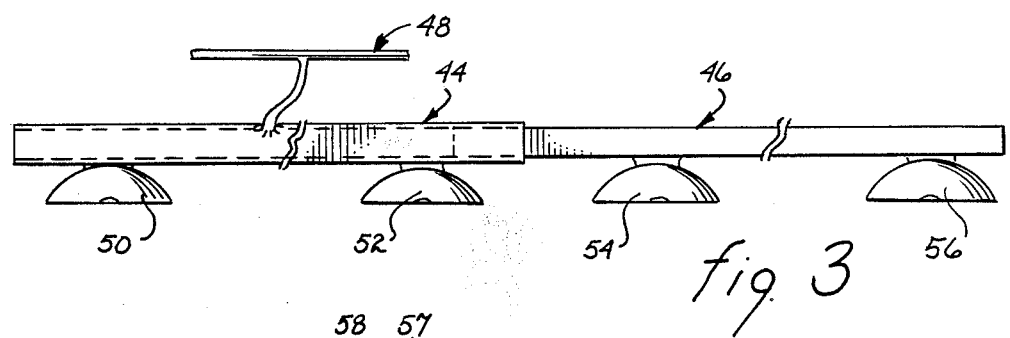
FIG. 3 is a top plan view of the automobile body protection apparatus of FIG. 2.

As shown in FIG. 2 and FIG. 3, outer bar 44 has a first suction cup 50, and a second suction cup 52. Inner bar 46 also has a third suction cup 54, and a fourth suction cup 56.

Figure 4:
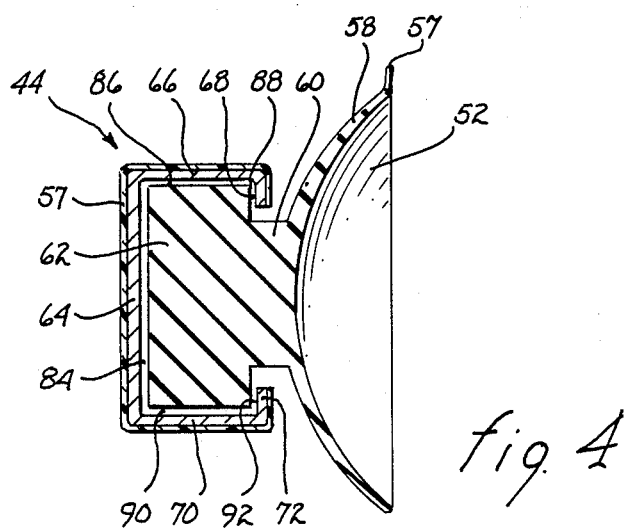
FIG. 4 is a sectional view as taken along the line 4—4 of FIG. 2.

As shown in FIG. 4, outer bar 44 has a rubber coating 57, which covers the exterior surface thereof. Cups 50, 52, 54, 56 support bars 44, 46, when the cups are connected to body 12. Small peel off lips 57 are provided for each of the cups 50, 52, 54 and 56 to facilitate peel off of each of the cup from the vehicle.

Cup 52, which is identical in construction to respective cups 50, 54, 56 has a flexible suction portion 58, a center stem portion 60, and an enlarged support portion 62. Enlarged portion 62 has a rectangular shape in cross section, and has a rectangular shape in lengthwise section.

Outer bar 44, which has a channel shape in cross section, has a web portion 64, a top flange 66 with a return portion 68, and a bottom flange 70 with a return portion 72.

Referring to FIG. 2, inner bar 46 has a corresponding web portion 74, a top flange 76 with a return portion 78, and a bottom flange 80 with a return portion 82. Return portions 68, 72, as shown in FIG. 4, overlap enlarged portion 62 of cup 52. Return portions 78, 82 overlap the respective enlarged portions of cups 54, 56. Return portions 68, 72 also overlap the respective enlarged portion of cup 50.

In FIG. 4, web 64 is separated by a gap 84 from enlarged portion 62. Top flange 66 and top return portion 68 are separated from enlarged portion 62 by respective gaps 86, 88. Bottom flange 70 and bottom return portion 72 are separated from enlarged portion 62 by respective gaps 90, 92. Gaps 86, 88, 90, 92 can vary in thickness depending upon the forces acting on bars 44, 46.

In FIG. 2, strap and bar arrangement 48 has a lower end portion 94, which is fixedly connected to outer bar 44. Strap and bar arrangement 48 also has an upper end portion 96, which has a bar shaped tee portion 98, that is positioned or placed inside or behind window 24 and center post 30.

In one embodiment of apparatus 14, strap and bar arrangement 48 comprises a flexible rubber strap, which has a nylon reinforcement. Strap lower end 94 is fixedly connected to rubber coating 57 on outer bar 44. Bar shaped tee portion 98 is relatively rigid in construction, and has more nylon reinforcement than the lower end 94 of strap and bar arrangement 48. Suction cups 50, 52, 54, 56 are preferably about two and one-quarter inches in outer diameter. Outer bar 44 and inner bar 46 are preferably made of steel, but may also be made of lightweight inexpensive plastic. When stretched out, bar assembly of bars 44, 46 is preferably about eight feet in length. When telescoped together, bar assembly of bars 44, 46 is preferably about four feet, six inches in length. Strap and bar arrangement 48 is a locking device to prevent an unwanted removal of apparatus 14 when apparatus 14 is mounted on body 12.

Apparatus 14 is adjustable in length. Cups 50, 52, 54, 56 are adjustable in location along the length of the bar assembly of bars 44, 46. Cups 50, 52, 54, 56 are slidable in a longitudinal direction relative to bars 44, 46, in order to best position cup 56 on panel 16, cups 52, 54 on panel 18 and cup 50 on panel 20.

The overall length of bar assembly of bars 44, 46 is adjustable to suit the distance of the panels between front wheel 34 and rear wheel 36. The position of cups 50, 52, 54, 56 are adjustable along the lengths of bars 44, 46, to suit the opposite panels and the adjusted length of apparatus 14.

In use, apparatus 14 acts as a removable guard. Cups 50, 52, 54, 56 support bars 44, 46, and are supported by body 12. Apparatus 14 prevents nicks and scratches on body 12, when automobile 10 is parked.

Apparatus 14 is locked to body 12 by means of strap and bar arrangement 48. Strap tee portion 98, which is positioned inside and behind window 24, bears against window 24 and center post 30.

When mounting apparatus 14, strap tee portion 98 is placed inside window 24. Strap lower end portion 94 is placed outside window 24, opposite panel 18. Then, window 24 is nearly fully closed (more than is shown in FIG. 1), in order to prevent taking tee portion 98 through the window opening 22. Door panel 18 is closed and locked, so that the apparatus 14 hangs on the outside of door panel 18, and is locked in position. Then, cups 50, 52, 54, 56 are connected to panels 16, 18, 20, by applying lateral forces on the cups.

When removing apparatus 14 from body 12, cups 50, 52, 54, 56 are peeled off from panels 16, 18, 20 using lips 57 of cups 50, 52, 54 and 56. Door panel 18 is then unlocked and opened. Window 24 is then lowered. Strap tee portion 98 is then moved out through window opening 22. Cups 50, 52 are slid toward the outboard end of bar 44 and cups 54, 56 are slid toward the outboard end of bar 46. Bars 44, 46 are then telescoped together or collapsed. Apparatus 14 can then be placed in the trunk of automobile 10 for storage thereof.

The advantages of apparatus 14 are described hereafter:

1. Apparatus 14 is adjustable in length, so that it fits different widths of side panels 16, 18, 20, and different lengths between front and rear wheels 34, 36, and different sizes of automobiles 10.

2. Cups 50, 52, 54, 56 are slidable along bars 44, 46, so that they can be best positioned along bars 44, 46, for fitting different widths of side panels 16, 18, 20 and different lengths between front and rear wheels 34, 36.

3. Strap 48 acts as a locking device, when apparatus 14 is mounted on body 12, so that apparatus 14 cannot be taken away from body 12, even though cups 50, 52, 54, 56 are disconnected from panels 16, 18, 20.

While the invention has been described in its preferred embodiments, it is to be understood that the words which have been used are words of description rather than limitation and that changes may be made within the preview of the appended claims without departing from the true scope and spirit of the invention in its broader aspects.

For example, outer bar 44 can have a stop member at its outboard end to prevent removal and separation of suction cups 50, 52 from outer bar 44. Inner bar 46 can also have a stop member at its outboard end to prevent removal and separation of cups 54, 56 from inner bar 46. Apparatus 14 can be used with all forms of vehicles such as trucks, vans, motor homes, etc.

I claim:

1. A vehicle body protection apparatus for protecting a vehicle body having a plurality of side panels and having a window opening with a window, comprising, in combination:

elongate telescoping bar assembly means comprising an elongate hollow outer bar and an elongate inner bar which is received within said outer bar for providing an adjustable bar assembly;

a plurality of suction cup support member means for connecting said bar assembly means to said side panels, said suction cup support means being substantially T-shaped in cross section and of a size smaller than the telescoping bar assembly means to allow the suction cup support means to be slidably connected to each of said inner bar and said outer bar in said bar assembly means; and locking assembly means coupled to said bar assembly means for preventing removal of said body protection apparatus from said vehicle body, said locking assembly means comprising a single flexible strap having a first end attached to said outer bar and a free second end for passing inside said vehicle body, said free second end of said strap having enlarged portion means for preventing removal of said protection apparatus from said vehicle.

2. The apparatus of claim 1, wherein said locking assembly means comprises an elongate rubber strap reinforced with elongate threads.

3. The apparatus of claim 1, wherein said plurality of suction cups include a first suction cup for connection to a front panel;

second and third suction cups for connection to a door panel and a fourth suction cup for connection to a rear panel.

4. The apparatus of claim 3, wherein said outer bar has a rubber coating fixedly connected to said elongate rubber strap lower end portion.

5. The apparatus of claim 4, wherein each said suction cup includes a flexible suction portion, a center stem portion connected to the flexible suction portion, and an enlarged support portion connected to the center stem portion.

6. The apparatus of claim 5 wherein each of said bar includes:

a web portion;
a top flange with a return portion; and
a bottom flange with a return portion, for receiving a suction cup enlarged portion between said flanges.

* * * * *